(12) United States Patent
Ito et al.

(10) Patent No.: US 11,760,151 B2
(45) Date of Patent: Sep. 19, 2023

(54) SUSPENSION DEVICE FOR ELECTRIC VEHICLE

(71) Applicant: Daimler AG, Stuttgart (DE)

(72) Inventors: Maki Ito, Kawasaki (JP); Chockalingam Hariharan, Tamil Nadu (IN)

(73) Assignee: Daimler Truck AG, Leinfelden-Echterdingen (DE)

( * ) Notice: Subject to any disclaimer, the term of this patent is extended or adjusted under 35 U.S.C. 154(b) by 0 days.

(21) Appl. No.: 17/780,788

(22) PCT Filed: Oct. 9, 2020

(86) PCT No.: PCT/JP2020/038376
§ 371 (c)(1),
(2) Date: May 27, 2022

(87) PCT Pub. No.: WO2021/106390
PCT Pub. Date: Jun. 3, 2021

(65) Prior Publication Data
US 2023/0032723 A1    Feb. 2, 2023

(30) Foreign Application Priority Data

Nov. 29, 2019    (JP) .................................. 2019-217195

(51) Int. Cl.
*B60K 17/16*    (2006.01)
*B60G 21/05*    (2006.01)
(Continued)

(52) U.S. Cl.
CPC ............... *B60G 21/05* (2013.01); *B60G 9/04* (2013.01); *B60G 11/04* (2013.01); *B60K 17/14* (2013.01); *B60K 17/165* (2013.01)

(58) Field of Classification Search
CPC ........ B62D 65/00; B62D 65/04; B62D 65/02; B60G 9/003; B60G 9/04; B60G 21/05; B60B 35/007
(Continued)

(56) References Cited

U.S. PATENT DOCUMENTS 3,257,134 A * 6/1966 Boyd ..................... B61D 17/10
                                                      411/277
4,470,611 A * 9/1984 Duphily ............... B60G 17/033
                                                      280/104

(Continued)

FOREIGN PATENT DOCUMENTS

CN    106240275 A  * 12/2016
EP    2 815 905 A1   12/2014
(Continued)

OTHER PUBLICATIONS

English-language European Extended Search Report issued in European application No. 20893487.7-1009 / 4063148 PCT/JP2020038376 dated Dec. 20, 2022 (Nine (9) pages).

(Continued)

*Primary Examiner* — James A Shriver, II
*Assistant Examiner* — Maxwell L Meshaka
(74) *Attorney, Agent, or Firm* — Crowell & Moring LLP

(57) ABSTRACT

A suspension device for electric vehicle includes a pair of hollow members each connected to an elastic body configured to suspend a vehicle body of the vehicle, the pair of hollow members each configured to house, in an internal space of the hollow member, part of an associated one of a pair of drive shafts, a beam member joined to the pair of hollow members, and at least one of a hollow member joint portion or a beam member joint portion having a projecting portion, the hollow member joint portion constituting a side surface of each of the hollow members, the beam member (Continued)

joint portion constituting a side surface of an end portion of the beam member, the other one of the hollow member joint portion or the beam member joint portion having a recessed portion.

11 Claims, 11 Drawing Sheets

(51) Int. Cl.
*B60G 9/04* (2006.01)
*B60G 11/04* (2006.01)
*B60K 17/14* (2006.01)

(58) Field of Classification Search
USPC .......................................................... 29/897.2
See application file for complete search history.

(56) References Cited

U.S. PATENT DOCUMENTS

| | | | |
|---|---|---|---|
| 2011/0001350 A1 | 1/2011 | Schmitz et al. | |
| 2013/0093154 A1* | 4/2013 | Cordier | B60G 3/20 |
| | | | 280/124.109 |
| 2015/0115572 A1* | 4/2015 | Kim | B60R 19/12 |
| | | | 293/146 |
| 2015/0115665 A1* | 4/2015 | Joyce | B62D 25/06 |
| | | | 296/210 |
| 2018/0361811 A1* | 12/2018 | Chua | B60G 9/003 |
| 2022/0169318 A1* | 6/2022 | Olsson | B60G 9/003 |
| 2023/0032723 A1* | 2/2023 | Ito | B60G 11/04 |

FOREIGN PATENT DOCUMENTS

| | | | | |
|---|---|---|---|---|
| JP | 9-111892 A | | 4/1997 | |
| JP | 2000-25440 A | | 1/2000 | |
| JP | 2013-71496 A | | 4/2013 | |
| JP | 2018-155311 A | | 10/2018 | |
| JP | 2019-10970 A | | 1/2019 | |
| JP | 2021084589 A | * | 6/2021 | |
| JP | 2021084590 A | * | 6/2021 | |
| WO | WO 2017/098492 A1 | | 6/2017 | |
| WO | WO-2017098492 A1 | * | 6/2017 | ........... B60G 21/051 |
| WO | WO 2019/046531 A1 | | 3/2019 | |

OTHER PUBLICATIONS

PCT/JP2020/038376, International Search Report dated Dec. 1, 2020 (Two (2) pages).

* cited by examiner

SUSPENSION DEVICE FOR ELECTRIC VEHICLE

TECHNICAL FIELD

The present invention relates to a suspension device for electric vehicle.

BACKGROUND ART

In the field of a passenger car, there has been known, for example, a de Dion type suspension device as a suspension device of an electric vehicle (see Patent Document 1, for example). Such a suspension device can reduce an unsprung weight compared with an axle type suspension device, thus improving the driving stability of a vehicle.

CITATION LIST

Patent Document

Patent Document 1: Japanese Unexamined Patent Publication No. 2000-25440

SUMMARY OF THE INVENTION

Technical Problem

In recent years, in the field of commercial vehicles such as a truck, electric commercial vehicles, such as an electric truck that has no internal combustion engine, have been developed from the viewpoint of environmental impact reduction. However, such an electric commercial vehicle has large vehicle weight as compared with a passenger car, and the vehicle weight further increases particularly when cargoes are loaded. Accordingly, an extremely large input affects the suspension device for the electric commercial vehicle, and higher reliability is thus required as compared with the suspension device for the passenger car.

A de Dion type suspension device in which a pair of saddles are connected to each other by way of an axle beam has been known as a rigid axle type of such a suspension device. However, there is a great demand for reducing a manufacturing cost in the de Dion type suspension device as well. When the saddles and the axle beam that constitute such a suspension device are manufactured as an integral body by forging or the like without welding, the reliability of the suspension device is improved. However, in the electric commercial vehicles manufactured in so many car classes, a manufacturing cost is significantly increased when the suspension device is manufactured by such a forging technique.

To reduce the manufacturing cost, it is conceivable to manufacture the saddles and the axle beam as separate members and fasten these members by bolts. However, extremely large inputs affect joint portions, where the saddles and the axle beam are fastened, and it is hence difficult to secure the reliability of the joint surfaces.

In addition, since a misalignment between the right and left saddles causes a malfunction, high alignment accuracy at the joint surfaces between the saddles and the axle beam is required to ensure reliability. Accordingly, working efficiency in manufacturing may be impaired.

The present invention was made to overcome at least some of such drawbacks, and it is an object of the present invention to provide a suspension device for an electric vehicle, such as an electric commercial vehicle, with improved reliability and manufacturing efficiency.

Solution to the Problem

The present invention was made to overcome at least some of the problems described above, and can be implemented as the following embodiments or application examples.

(1) A suspension device for electric vehicle according to an application example includes: a power transmission mechanism to which a driving force of a motor mounted on a vehicle is transmitted; and a pair of drive shafts configured to transmit the driving force transmitted to the power transmission mechanism to a pair of wheels, the suspension device for electric vehicle including a pair of hollow members each connected to an elastic body configured to suspend a vehicle body of the vehicle, the pair of hollow members each configured to house, in an internal space of the hollow member, part of an associated one of the pair of drive shafts, and a beam member joined to the pair of hollow members by bolt fastening, at least one of a hollow member joint portion or a beam member joint portion having a projecting portion, the hollow member joint portion constituting a side surface of each of the hollow members, the beam member joint portion constituting a side surface of an end portion of the beam member, the other one of the hollow member joint portion or the beam member joint portion having a recessed portion.

As described above, at least one of the hollow member joint portion or the beam member joint portion has a projecting portion, and the other one of the hollow member connection portion or the beam member end connection portion has a recessed portion to be engaged with the projecting portion. This configuration can increase the strength of the joint portion between the hollow member and the beam member, and can thus improve the reliability of the suspension device. It is also possible to increase the positional accuracy in joining the hollow member and the beam member. The alignment of the axle beam and the saddle in a manufacturing process is thus facilitated, which can improve manufacturing efficiency.

(2) In the suspension device for electric vehicle according to the application example of the configuration (1) above, the projecting portion and the recessed portion may each have a rectangular cross-sectional shape as viewed from a vehicle lateral side. These configurations allow the projecting portion and the recessed portion to be manufactured so as to be engaged accurately with each other, and can increase the strength of the joint portion against the bending stress.

(3) In the suspension device for electric vehicle according to the application example of the configuration (1) above, the projecting portion and the recessed portion may each have a trapezoidal cross-sectional shape as viewed from a vehicle lateral side. These configurations can increase the contact area between the projecting portion and the recessed portion and can improve the reliability of joint strength.

(4) In the suspension device for electric vehicle according to the application example of any one of the configurations (1) to (3) above, the projecting portion may be formed so that a long side of the projecting portion extends in a vehicle width direction of the vehicle, and the recessed portion may be formed so that a long side of the recessed portion extends in the vehicle width direction of the vehicle. Accordingly, the projecting portion and the recessed portion are used as guides in joining the hollow member and the beam member together so that the projecting portion and the recessed portion are slid while engaged with each other, which can facilitate the alignment. The alignment of the axle beam and the saddle in a manufacturing process is thus more facilitated, which can further improve manufacturing efficiency. It is also possible to increase the strength against the bending stress in the vertical direction (the gravity direction) of the joint portion, and therefore possible to further improve the reliability of the suspension device.

(5) In the suspension device for electric vehicle according to the application example of any one of the configurations (1) to (4) above, the projecting portion may be provided at the side surface of each of the hollow members. Accordingly, the thickness of the hollow member can be ensured. It is thus possible to form through holes for insertion of a U-shaped bolt or the like to connect the elastic body without increasing the size of the hollow member.

(6) In the suspension device for electric vehicle according to the application example of any one of the configurations (1) to (5) above, a plurality of bolts for joining the beam member and each of the hollow members may include a first bolt fastening portion group of a plurality of bolt fastening portions, a second bolt fastening portion group of a plurality of bolt fastening portions, and a third bolt fastening portion group of a plurality of bolt fastening portions, the first bolt fastening portion group being arranged in a first vehicle height position at a predetermined interval along the vehicle width direction, the second bolt fastening portion group being arranged in a second vehicle height position higher than the first vehicle height position at a predetermined interval along the vehicle width direction, the third bolt fastening portion group being arranged in a third vehicle height position between the first vehicle height position and the second vehicle height position at a predetermined interval along the vehicle width direction, and the third bolt fastening portion group may be disposed so as to pass through the projecting portion and the recessed portion.

(7) In the suspension device for electric vehicle according to the application example of the configuration (6) above, the first bolt fastening portion group and the second bolt fastening portion group may be located at same positions in the vehicle width direction, the third bolt fastening portion group may be located at a position between the first bolt fastening portion group and the second bolt fastening portion group in the vehicle width direction, and among the plurality of bolt fastening portions, the bolt fastening portion closest to the wheel of the vehicle may belong to the third bolt fastening portion group. These configurations can make the contact pressure on the joint portion between the beam member and the hollow member uniform. Further, the hole in the third vehicle height position is disposed at an outermost position, that is, closest to the wheel in the vehicle width direction among, which makes it possible to increase the strength against the stress generated in a portion near the wheel.

(8) In the suspension device for electric vehicle according to the application example of the configuration (6) or (7) above, among the bolts for joining the beam member and each of the hollow members, the bolts belonging to the second bolt fastening portion group may have a diameter larger than a diameter of the bolts belonging to the first bolt fastening portion group and the second bolt fastening portion group. Using bolts having a greater diameter in the third vehicle height position, where a smaller number of bolts are used, can improve tightening torque and make the contact pressure on the joint surface of the entire joint portion uniform.

(9) In the suspension device for electric vehicle according to the application example of any one of the configurations (1) to (8) above, the beam member may be an integrally forged plate-like member having a predetermined width to support the pair of wheels and may include: a pair of axle end portions to be joined to the respective hollow members; a pair of extension portions extending from the respective axle end portions inwardly toward a rear side of the vehicle; and a connection portion that connects the pair of extension portions

(10) In the suspension device for electric vehicle according to the application example of the configuration (9) above, the beam member may be an integrally forged plate-like member having a predetermined width to support the pair of wheels and may include: a pair of axle end portions to be joined to the respective hollow members; a pair of extension portions extending from the respective axle end portions inwardly toward a rear side of the vehicle; and a connection portion that connects the pair of extension portions, a boundary area between each of the extension portions and the connection portion may be provided with a thick portion in a lower portion of the boundary area in a vehicle height direction, the thick portion having a width larger than the predetermined width, and the thick portion may have a support portion for supporting a component relating to the suspension device. The boundary between the extension portion and the connection portion of the axle beam is provided with the thick portion having a width larger than a predetermined width in the lower portion of the boundary area in the vehicle height direction. And the thick portion has a support portion for supporting a component relating to the suspension device. The thick portion can thus increase the strength of the axle beam and improve the reliability. The provision of the support portion in the thick portion to support components relating to the suspension device, such as the shock absorber, can ensure the mountability of the components relating to the suspension device and the design flexibility.

(11) In the suspension device for electric vehicle according to the application example of the configuration (9) or (10) above, the connection portion may include a thin portion extending in the vehicle width direction and having a width smaller than the predetermined width, an upper connection portion above the thin portion in the vehicle height direction, and a lower connection portion below the thin portion in the vehicle height direction, and a width of the upper connection portion in the vehicle height direction may be smaller than a width of the lower connection portion in the vehicle height direction. The thin portion can reduce weight of the axle beam as a whole. The upper connection portion having the smaller width than the width of the lower connection portion, that is, the lower connection portion having the larger width s than the width of the upper connection portion, can ensure the strength against the bending stress input to the axle beam 31 and can thus further improve reliability.

DESCRIPTION OF EMBODIMENT

Figure 1A:
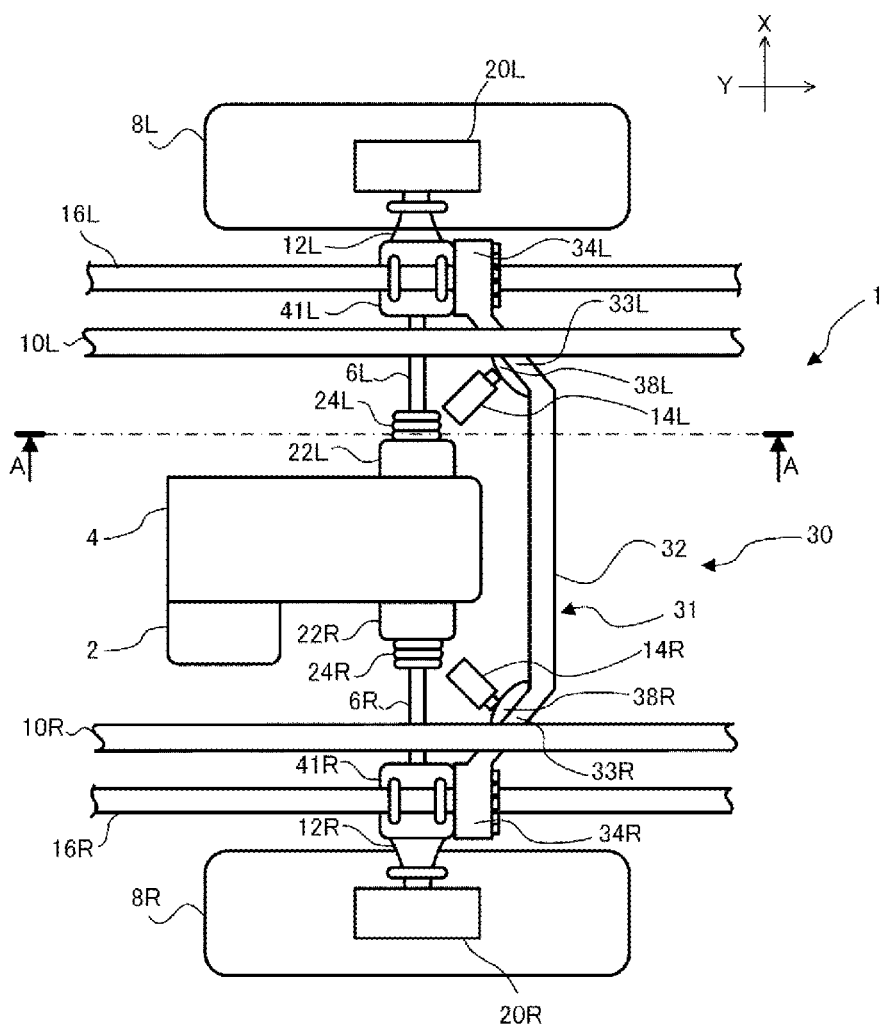
FIG. 1A is a top view.
Figure 1B:
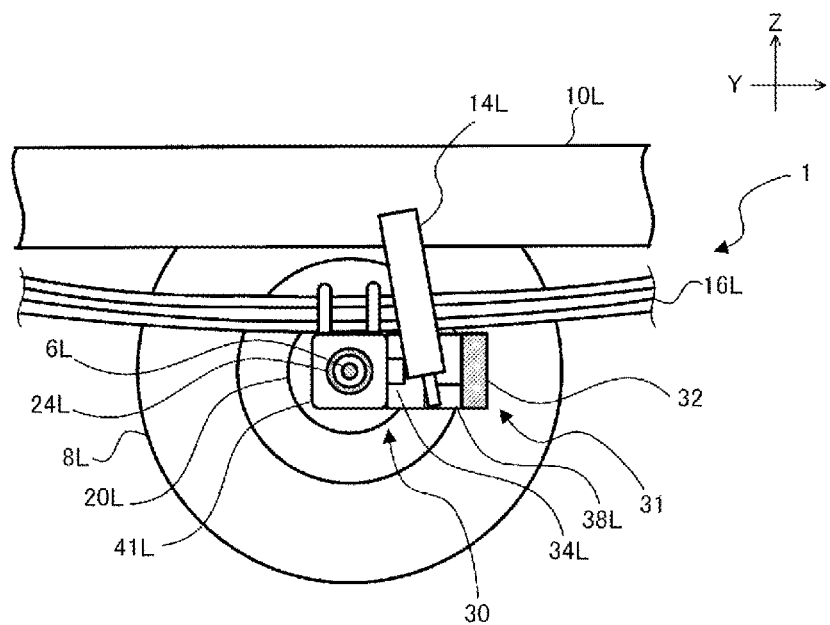
FIG. 1B is a side view, of a schematically illustrated suspension device according to an embodiment of the present invention.

Hereinafter, an embodiment of the present invention will be described with reference to the drawings. FIG. 1A is a top view, and FIG. 1B is a side view, of a schematically illustrated suspension device according to an embodiment of the present invention. The side view in FIG. 1B is a cross-section taken along line A-A in FIG. 1A, part of which is simplified. The suspension device 1 is a de Dion type suspension device, which is, for example, a rear axle arranged on the rear side of an electric commercial vehicle (hereinafter, referred to as a vehicle), such as an electric truck.

The vehicle has a motor 2 mounted thereon as a driving source. The driving force of the motor 2 is transmitted to right and left wheels 8L, 8R by way of a power transmission mechanism 4, which includes a reducer comprising a plurality of reduction gears and a differential gear connected to the reducer, and a pair of drive shafts 6L, 6R in the order given above. The wheels 8L, 8R are respectively supported on side rails (vehicle body) 10L, 10R extending in a vehicle longitudinal direction Y by way of the suspension device 1. The motor 2 and the power transmission mechanism 4 including the differential gear are supported on a vehicle body not shown. These members can be supported, for example, on the vehicle body by way of a cross member of a frame and the side rails 10L, 10R.

The suspension device 1 comprises a pair of spindles 12L, 12R, a pair of saddles (hollow members) 41L, 41R, a pair of leaf springs (elastic bodies) 16L, 16R, an axle beam (beam member) 31, etc. The spindles 12L, 12R are a pair of members arranged on both ends in a vehicle width direction X.

Hubs 20L, 20R are coupled to outside end portions of the spindles 12L, 12R in the lateral direction of the vehicle. Wheel parts (not shown) arranged inside the wheels (assembly) 8L, 8R are attached to the hubs 20L, 20R.

The drive shaft 6L, 6R has a flexible joint 22L, 22R at an inner end (vehicle inner side) of the drive shaft 6L, 6R in the vehicle width direction X, and the flexible joints are connected to the gears of the power transmission mechanism 4. Part of the flexible joint 22L, 22R is covered with a boot 24L, 24R.

The saddles 41L, 41R are a pair of hollow members each joined to an inner end of the associated one of the spindles 12L, 12R in the vehicle width direction X. The inside of the saddle 41L, 41R communicates with the spindle 12L, 12R, and the drive shaft 6L, 6R is housed in the internal space of the saddle 41L, 41R. The saddle 41L, 41R is coupled to the leaf spring 16L, 16R with a U-shaped bolt.

The leaf spring 16L, 16R extends in the vehicle longitudinal direction Y, and is connected (not shown) to the side rail 10L, 10R, thereby elastically supporting the vehicle body.

The axle beam 31, which is a member connected to the saddles 41L, 41R, is joined to the spindles 12L, 12R and the saddles 41L, 41R thus forming an axle structure 30. The axle beam 31 is supported by the side rails 10L, 10R by way of shock absorbers 14L, 14R, and supports the wheels 8L, 8R while ensuring the rigidity of the axle structure 30. The axle beam 31 includes thick portions 38L, 38R, at which the axle beam 31 is connected to the shock absorbers 14L, 14R.

In this manner, in the above-mentioned suspension device 1, the leaf springs 16L, 16R suspend and elastically support therebelow the axle structure 30, the drive shafts 6L, 6R, and the wheels 8L, 8R.

In the present embodiment, a configuration will be described in which the saddle 41L, 41R is coupled to the leaf spring 16L, 16R on an upper seating face (upper surface) of the saddle 41L, 41R. However, the present invention is not limited thereto, and the saddle 41L, 41R may be coupled to the leaf spring 16L, 16R on a lower seating face (lower surface) of the saddle 41L, 41R. Further, as the elastic body, the leaf spring 16L, 16R may be replaced with an air spring.

Figure 2:
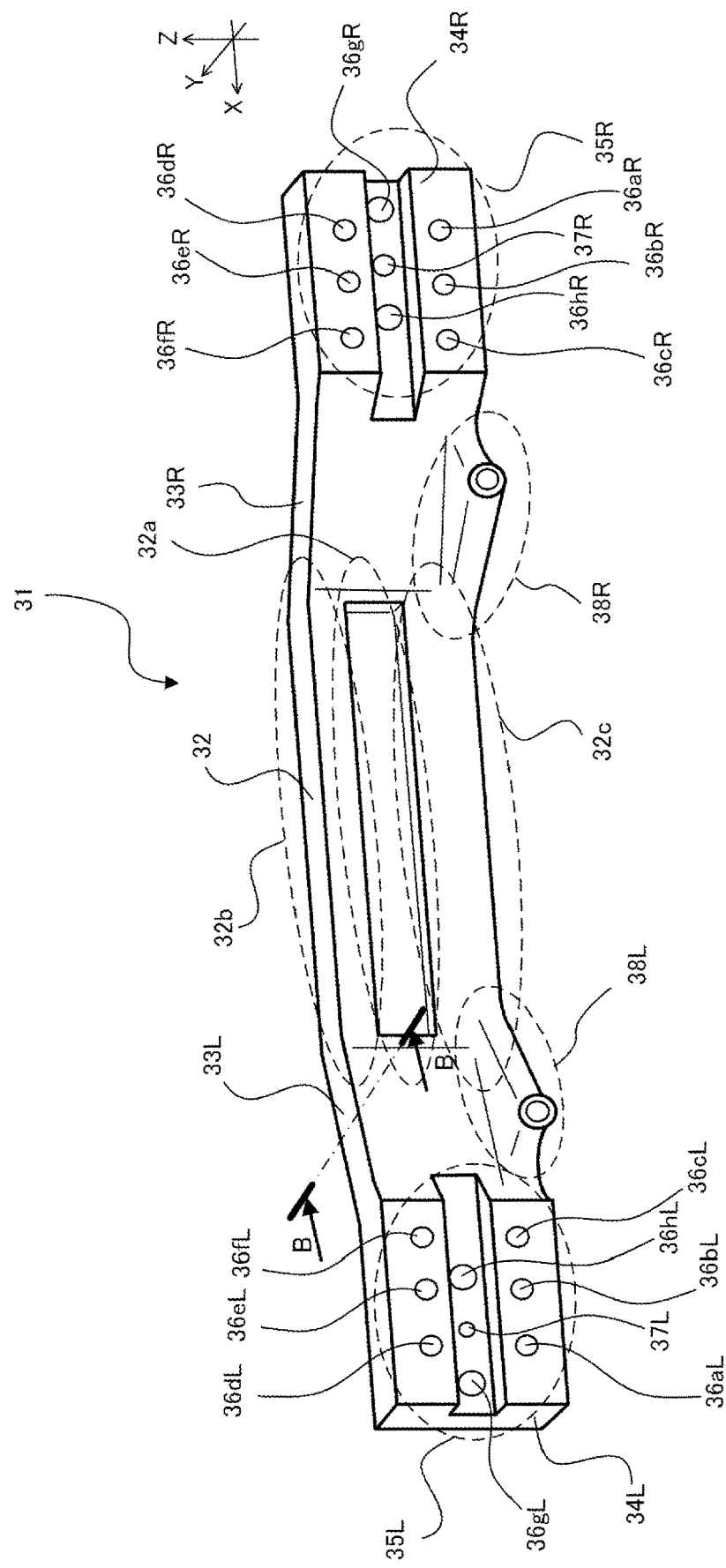
FIG. 2 is a perspective view of an axle beam that constitutes the suspension device.

FIG. 2 is a perspective view of the axle beam 31 that constitutes the suspension device 1. The axle beam 31 is an integrally forged plate-like member having a predetermined width and includes: a connection portion 32 extending in the vehicle width direction X; a pair of extension portions 33L, 33R extending from the connection portion 32 in the vehicle width direction X and the vehicle longitudinal direction Y, that is, extending inwardly toward the rear side of the vehicle; and a pair of axle end portions 34L, 34R each extending from the associated one of the extension portions 33L, 33R in the vehicle width direction X.

The axle end portions 34L, 34R have axle-side joint portions (beam member joint portions) 35L, 35R to be joined to the saddles 41L, 41R, respectively. The axle-side joint portion 35L, 35R has a recessed portion in a middle area in a vehicle height direction Z. The recessed portion is formed as a slit with the long side extending in the vehicle width direction X.

The axle end portion 34L, 34R has a plurality of through holes 36aL to 36hL, 36aR to 36hR for insertion of bolts, and a through hole 37L, 37R for insertion of a knock-pin (not shown) for alignment. The plurality of through holes 36aL to 36hL, 36aR to 36hR are provided in three rows, i.e., in a first vehicle height position, a second vehicle height position, and a third vehicle height position, in the vehicle height direction. The through holes 36aL to 36cL, 36aR to 36cR are disposed at predetermined intervals along the vehicle width direction X in the first vehicle height position. The through holes 36dL to 36fL, 36dR to 36fR are disposed at predetermined intervals along the vehicle width direction X in the second vehicle height position. The through holes 36gL and 36hL, 36gR and 36hR are disposed at a predetermined interval along the vehicle width direction X in the third vehicle height position. The second vehicle height position is located higher than the first vehicle height position in the vehicle height direction Z, and the third vehicle height position is located between the first vehicle height position and the second vehicle height position. The through holes 36gL, 36hL, and 37L, and the through holes 36gR, 36hR, and 37R arranged in the third vehicle height position pass through the recessed portions. Among the plurality of through holes, the through holes 36hL and 36dR in the third vehicle height position are closest to the wheels 8L and 8R of the vehicle, respectively. The hole diameter of the through hole 36gL, 36hL is larger than the hole diameter of each of the through holes 36aL to 36cL and 36dL to 36fL. Thus, a bolt having a larger diameter than a bolt for insertion into each of the through holes 36aL to 36cL and 36dL to 36fL can be used for insertion into the through hole 36gL, 36hL. Similarly, the hole diameter of the through hole 36gR, 36hR is larger than the hole diameter of each of the through holes 36aR to 36cR and 36dR to 36fR. Thus, a bolt having a larger diameter than a bolt for insertion into each of the through holes 36aR to 36cR and 36dR to 36fR can be used for insertion into the through hole 36gR, 36hR.

Among the through holes 36aL to 36hL in the axle end portion 34L, the through holes 36aL to 36cL disposed in the first vehicle height position and the through holes 36dL to 36fL disposed in the second vehicle height position are respectively located at same positions in the vehicle width direction X. On the other hand, the through hole 36gL, 36hL disposed in the third vehicle height position is offset. Similarly, among the through holes 36aR to 36hR in the axle end portion 34R, the through holes 36aR to 36cR disposed in the first vehicle height position and the through holes 36dR to 36fR disposed in the second vehicle height position are respectively located at same positions in the vehicle width direction X. On the other hand, the through hole 36gR, 36hR disposed in the third vehicle height position is offset.

The extension portion 33L, 33R has the thick portion 38L, 38R in a lower area in the vehicle height direction Z so as to extend over the boundary with the connection portion 32. The thick portion 38L, 38R has a bolt hole 39L, 39R for screwing a bolt for engagement of the shock absorber 14L, 14R.

Figure 3:
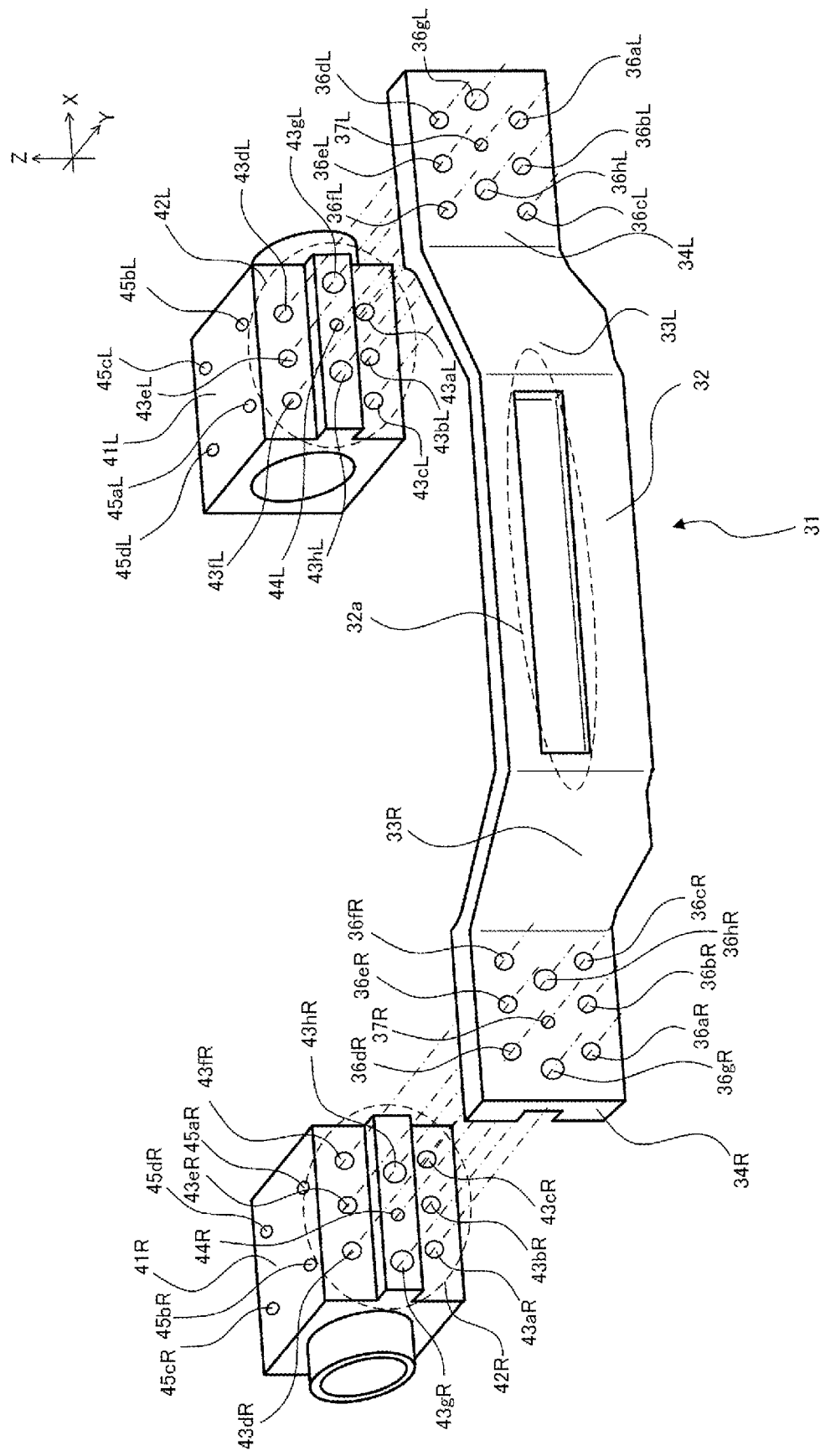
FIG. 3 is a perspective view of the axle beam and saddles.

FIG. 3 is a perspective view of the axle beam 31 and the saddles 41L and 41R that form the suspension device 1. The saddles 41L, 41R have saddle-side joint portions (hollow member joint portions) 42L, 42R to be joined to the axle-side joint portions 35L, 35R of the axle beam 31, respectively. The saddle-side joint portion 42L, 42R has a projecting portion in a middle area in the vehicle height direction Z. The projecting portion is formed as a projection with the long side extending in the vehicle width direction X.

The saddle-side joint portion 42L, 42R has holes 43aL to 43hL, 43aR to 43hR for screwing bolts, and a hole 44L, 44R for insertion of a knock-pin (not shown) for alignment, at positions corresponding to the axle-side joint portions 35L, 35R. The holes 43gL, 43hL, and 44L, and the holes 43gR, 43hR, and 44R pass through the projecting portions of the respective saddle-side joint portions 42L and 42R. The saddle 41L, 41R has through holes 45aL to 45dL, 45aR to 45dR that pass through the saddle 41L, 41R from top to bottom surface so that U-shaped bolts are inserted to achieve coupling with the leaf spring 16L, 16R.

Figure 4:
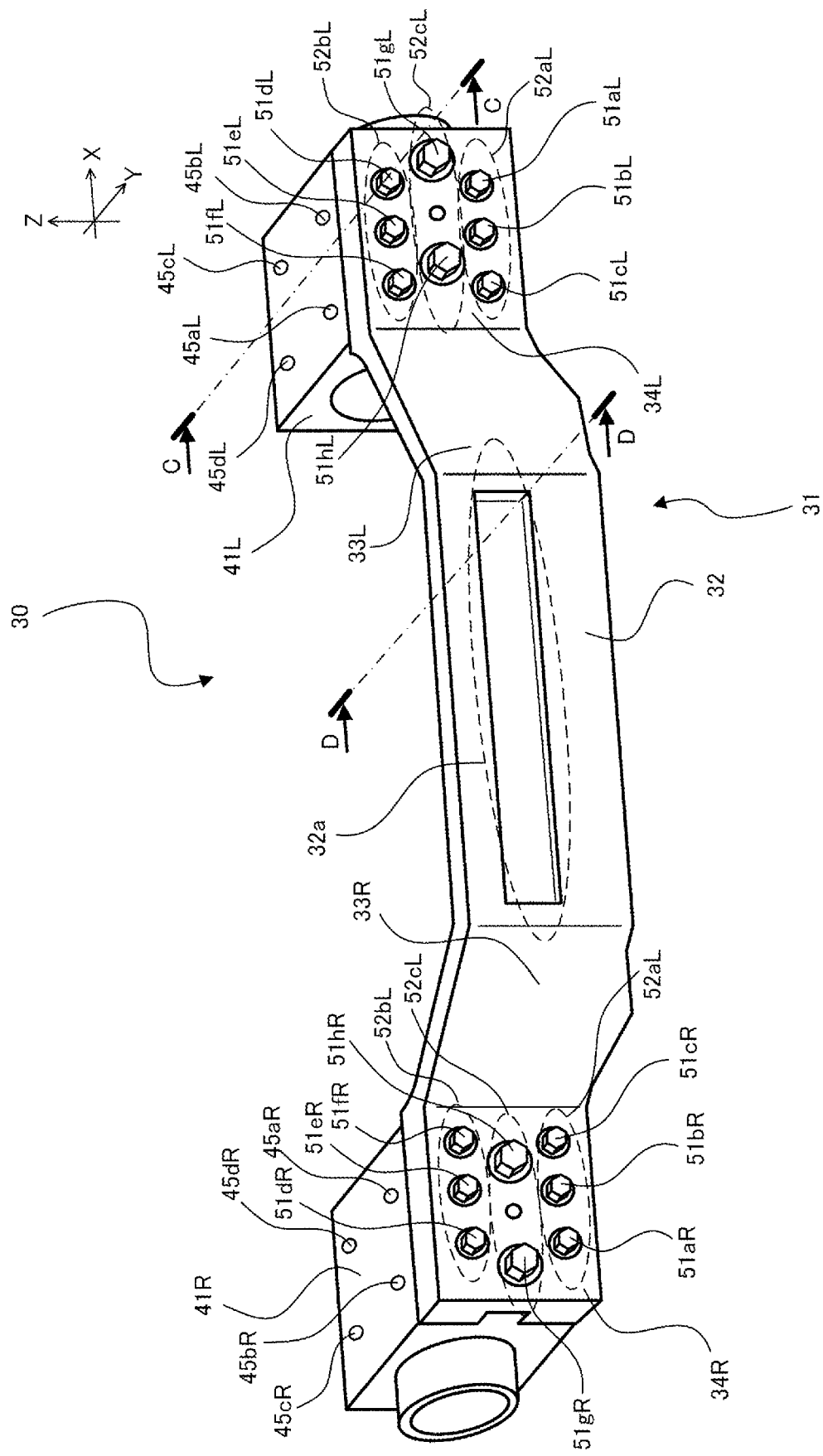
FIG. 4 is a perspective view of an axle structure in which the axle beam and the saddles are joined together.

FIG. 4 is a perspective view of the axle structure 30 in which the axle beam 31 and the saddles 41L and 41R are joined together. The axle structure 30 has a joined configuration in which the recessed portion of the axle-side joint portion 35L, 35R of the axle beam 31 and the projecting portion of the saddle-side joint portion 42L, 42R of the saddle 41L, 41R are engaged with each other with bolts 51aL to 51hL, 51aR to 51hR. That is, the contact portion between the axle-side joint portion 35L, 35R and the saddle-side joint portion 42L, 42R constitutes a joint portion. As described with reference to FIG. 2, the through holes 36aL to 36cL and the through holes 36dL to 36fL in the axle end portion 34L are respectively located at same positions in the vehicle width direction X; on the other hand, the through holes 36gL and 36hL are offset relative to these through holes. Thus, the bolts 51aL to 51cL belonging to a first bolt fastening portion group 52aL, and the bolts 51dL to 51fL belonging to a second bolt fastening portion group 52bL are respectively located at same positions in the vehicle width direction X. The bolt 51gL belonging to a third bolt fastening portion group 52cL is arranged closest to the wheel 8L among the bolts belonging to the first bolt fastening portion group 52aL and the bolts belonging to the second bolt fastening portion group 52bL. Similarly, the bolts 51aR to 51cR belonging to a first bolt fastening portion group 52aR, and the bolts 51dR to 51fR belonging to a second bolt fastening portion group 52bR are respectively located at same positions in the vehicle width direction X. The bolt 51gR belonging to a third bolt fastening portion group 52cR is arranged closest to the wheel 8R among the bolts belonging to the first bolt fastening portion group 52aR and the bolts belonging to the second bolt fastening portion group 52bR. That is, the bolts 51aL to 51hL, 51aR to 51hR are arranged in a non-grid array. In addition, as described with reference to FIG. 2, the through hole 36gL, 36gR in the third vehicle height position is provided at an outermost position in the vehicle width direction X of the axle beam 31 among the other through holes. Thus, the bolt 51gL, 51gR is disposed at an outermost position, that is, closest to the wheel 8L, 8R in the vehicle width direction X among the other bolts, which makes it possible to increase the strength against the stress generated in a portion near the wheel.

Figure 5A:
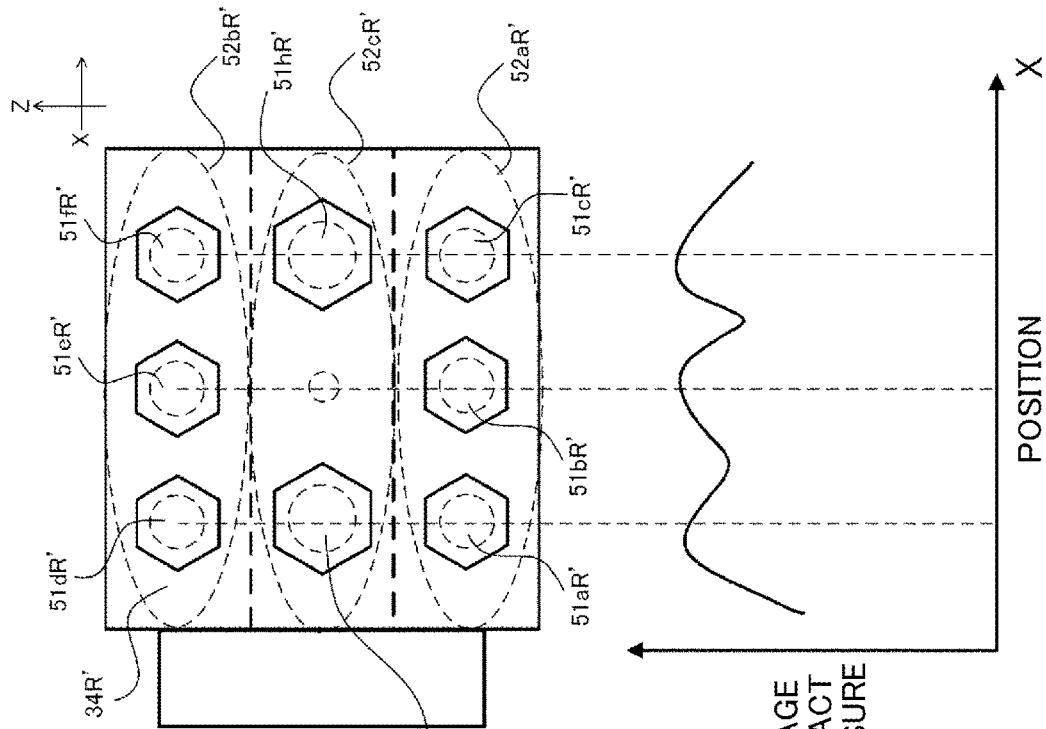
FIG. 5A includes a partial front view of a joint state of an end portion of the axle beam and the saddle and a graph showing average contact pressures.
Figure 5B:
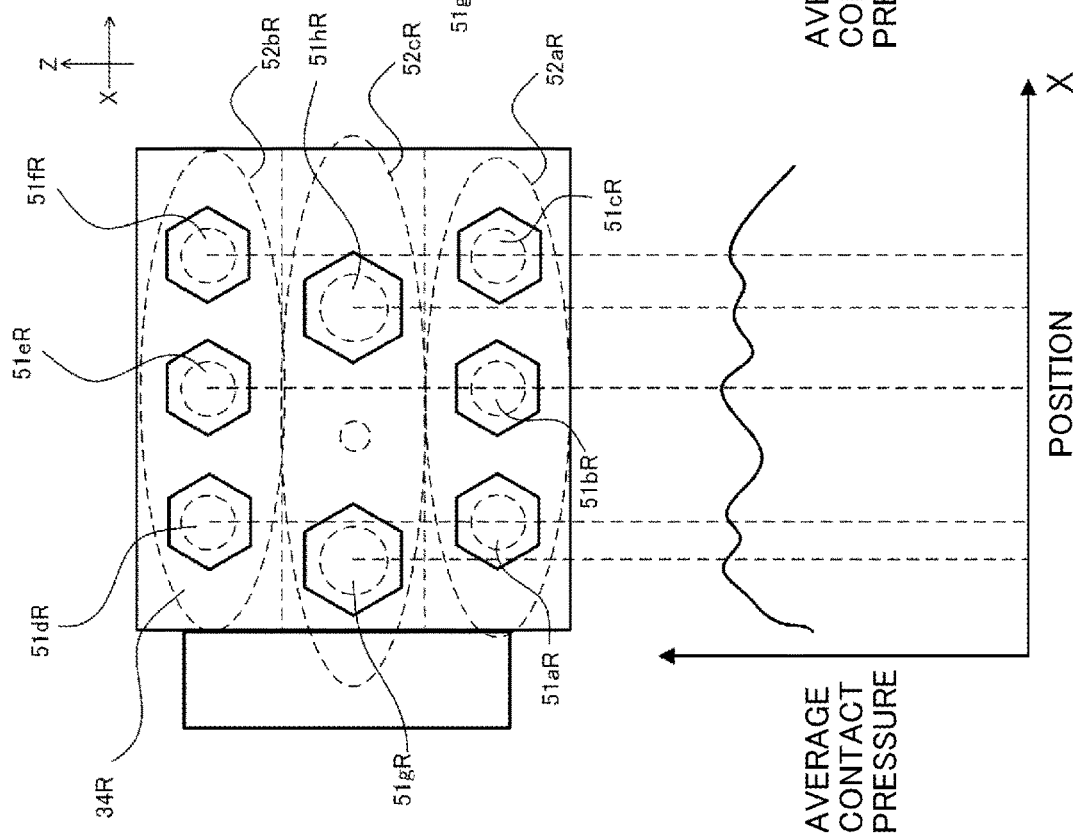
FIG. 5B includes a partial front view of a joint state of an end portion of the axle beam and the saddle according to a comparative example.

FIG. 5A includes a partial front view of a joint state of the axle end portion 34R and the saddle 41R, and a graph showing average contact pressures relating to the joint surface between the axle-side joint portion 35R and the saddle-side joint portion 42R. In the graph, the horizontal axis represents the position in the vehicle width direction X, and the vertical axis represents the average contact pressure on the joint surface at positions in the direction X. FIG. 5B includes a partial front view of a joint state of an axle end portion 34R' and a saddle 41R' according to a comparative example, and a graph showing average contact pressures relating to the joint surface between an axle-side joint surface 35R' and a saddle-side joint surface 42R'.

In FIG. 5A, the bolts 51aR to 51cR belonging to the first bolt fastening portion group 52aR and the bolts 51dR to 51fR belonging to the second bolt fastening portion group 52bR are respectively located at same positions in the vehicle width direction X. The bolts 51gR and 51hR belonging to the third bolt fastening portion group 52cR are offset relative to the bolts belonging to the first bolt fastening portion group 52aR and the bolts belonging to the second bolt fastening portion group 52bR in the vehicle width direction X. On the other hand, in FIG. 5B that is the comparative example, a bolt 51aR', 51cR' belonging to a first bolt fastening portion group 52aR', and a bolt 51dR', 51fR' belonging to a second bolt fastening portion group 52bR' are respectively located at same positions in the vehicle width direction X as a bolt 51gR', 51hR' belonging to a third bolt fastening portion group 52cR'.

The comparison between the graph of FIG. 5A according to the present embodiment and the graph of FIG. 5B according to the comparative example shows that fluctuations in the average contact pressure are smaller in the graph according to the present embodiment than in the graph according to the comparative example. That is, the arrangement of the bolt fastening portion groups of the present embodiment can make the contact pressure on the joint surface of the entire joint portion uniform.

Regarding bolt types, M18 bolts may be used, for example, as the bolts 51aL to 51cL belonging to the first bolt fastening portion group 52aL, the bolts 51dL to 51fL belonging to the second bolt fastening portion group 52bL, the bolts 51aR to 51cR belonging to the first bolt fastening portion group 52aR, and the bolts 51dR to 51fR belonging to the second bolt fastening portion group 52bR; and M20 bolts may be used, for example, as the bolts 51gL and 51hL belonging to the third bolt fastening portion group 52cL, and the bolts 51gR and 51hR belonging to the third bolt fastening portion group 52cR. That is, the size of the bolts used in the third bolt fastening portion group 52cL, 52cR may be larger than the size of the bolts used in the first bolt fastening portion group 52aL, 52aR and the second bolt fastening portion group 52bL, 52bR. Using bolts having a greater diameter in the third bolt fastening portion group 52cL, 52cR, where a smaller number of bolts are used, can improve tightening torque and make the contact pressure on the joint surface of the entire joint portion uniform. These configurations can reduce slipping on the joint surface between the axle beam 31 and the saddle 41L, 41R, and increase the strength of the joint portion.

Figure 6:
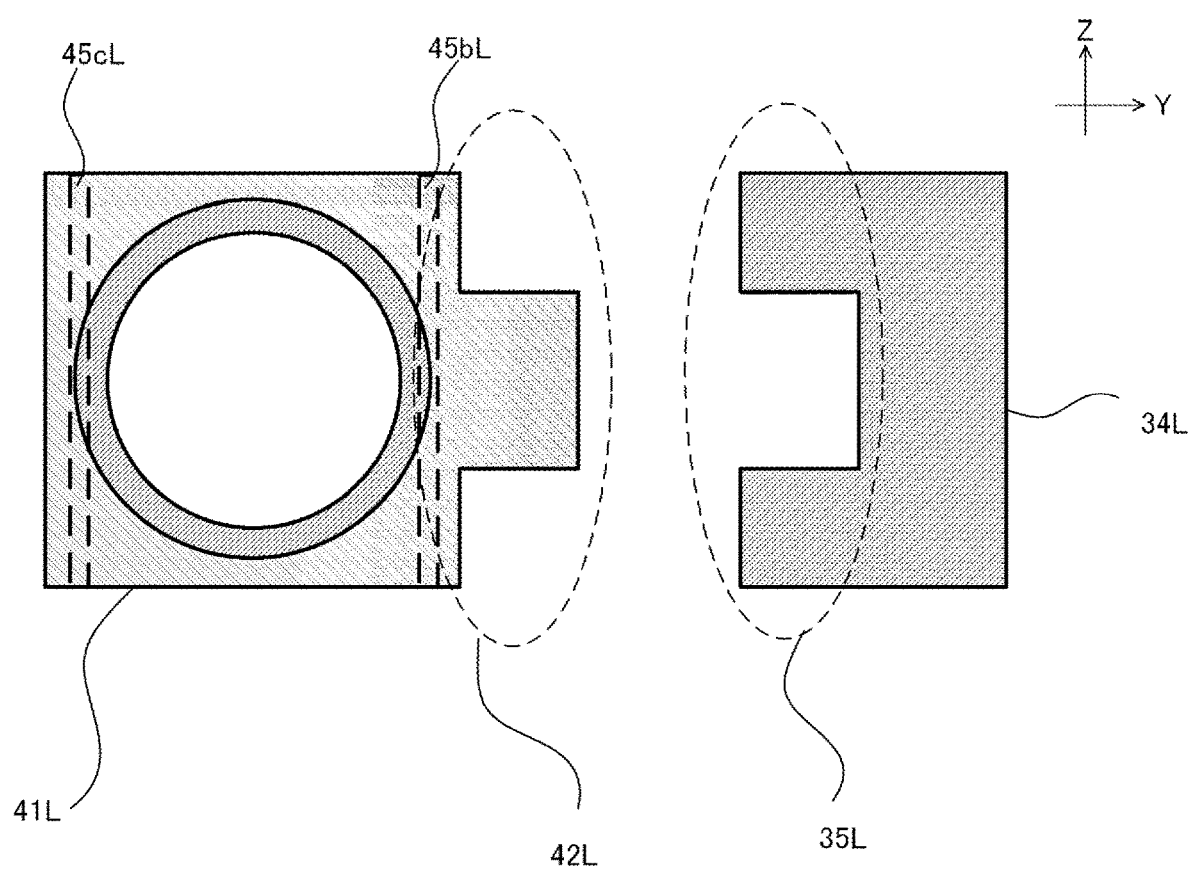
FIG. 6 is a cross-section of an end portion of the axle beam and the saddle taken along line C-C in FIG. 4, and illustrates only an end portion.

FIG. 6 is a cross-section taken along line C-C in FIG. 4, and includes cross-sections of the axle end portion 34L and the saddle 41L. The recessed portion formed in the axle-side joint portion 35L of the axle end portion 34L has a rectangular cross-sectional shape as viewed from a vehicle lateral side. The projecting portion, which is a protrusion formed in the saddle-side joint portion 42L of the saddle 41L and engages with the recessed portion, also has a rectangular cross-sectional shape as viewed from the vehicle lateral side. These configurations allow the projecting portion and the recessed portion to be manufactured so as to be engaged accurately with each other, and can increase the strength of the joint portion against the bending stress.

Figure 7:
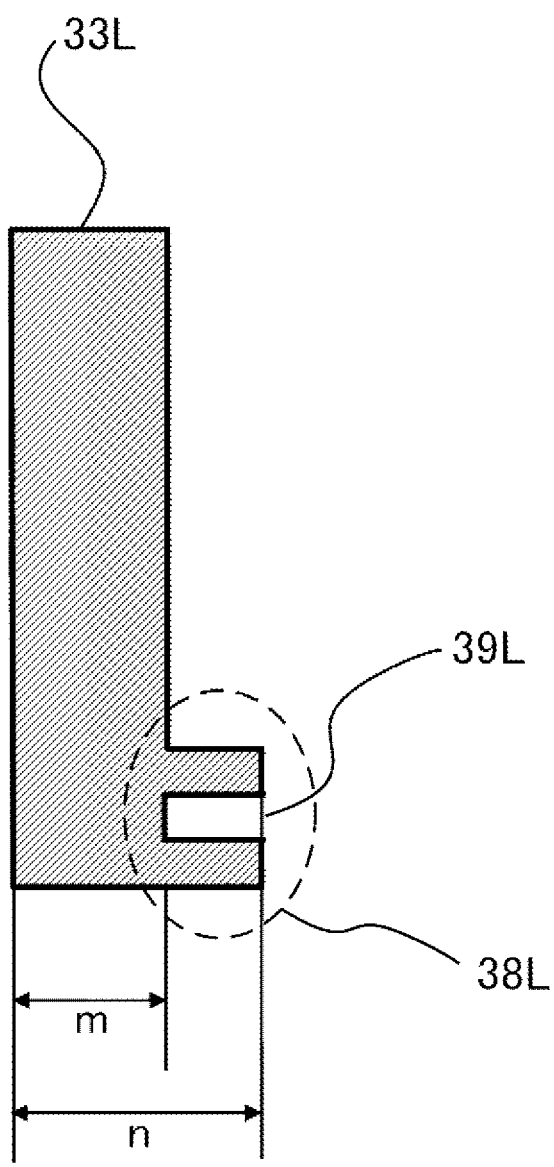
FIG. 7 is a cross-section of an extension portion of the axle beam taken along line B-B in FIG. 2, and illustrates only an end surface.

FIG. 7 is a cross-section of an extension portion 33L of the axle beam 31 taken along line B-B in FIG. 2, and illustrates only an end surface. The extension portion 33L has a predetermined width m. The maximum width (thickness) n of the thick portion 38L is larger than the predetermined width m. The thick portion 38L has the bolt hole 39L that is a support portion. As illustrated in FIG. 2, the thick portion 38L is provided in the lower portion in the vehicle height direction Z at the boundary area between the extension portion 33L and the connection portion 32. Accordingly, it is possible to increase the strength against the shearing stress and the bending stress applied to between the extension portion 33L and the connection portion 32. The boundary area between the extension portion 33L, 33R and the connection portion 32 is provided with the thick portion 38L, 38R having the width (thickness) n larger than the predetermined width m in the lower portion of the boundary area in the vehicle height direction Z. The thick portion increases the strength of the axle beam and improves reliability. The thick portion 38L, 38R has the bolt hole (support portion) 39L, 39R for engagement with components relating to the suspension device, such as the shock absorber 14L, 14R. This configuration can ensure the mountability of the components relating to the suspension device and the design flexibility.

Figure 8:
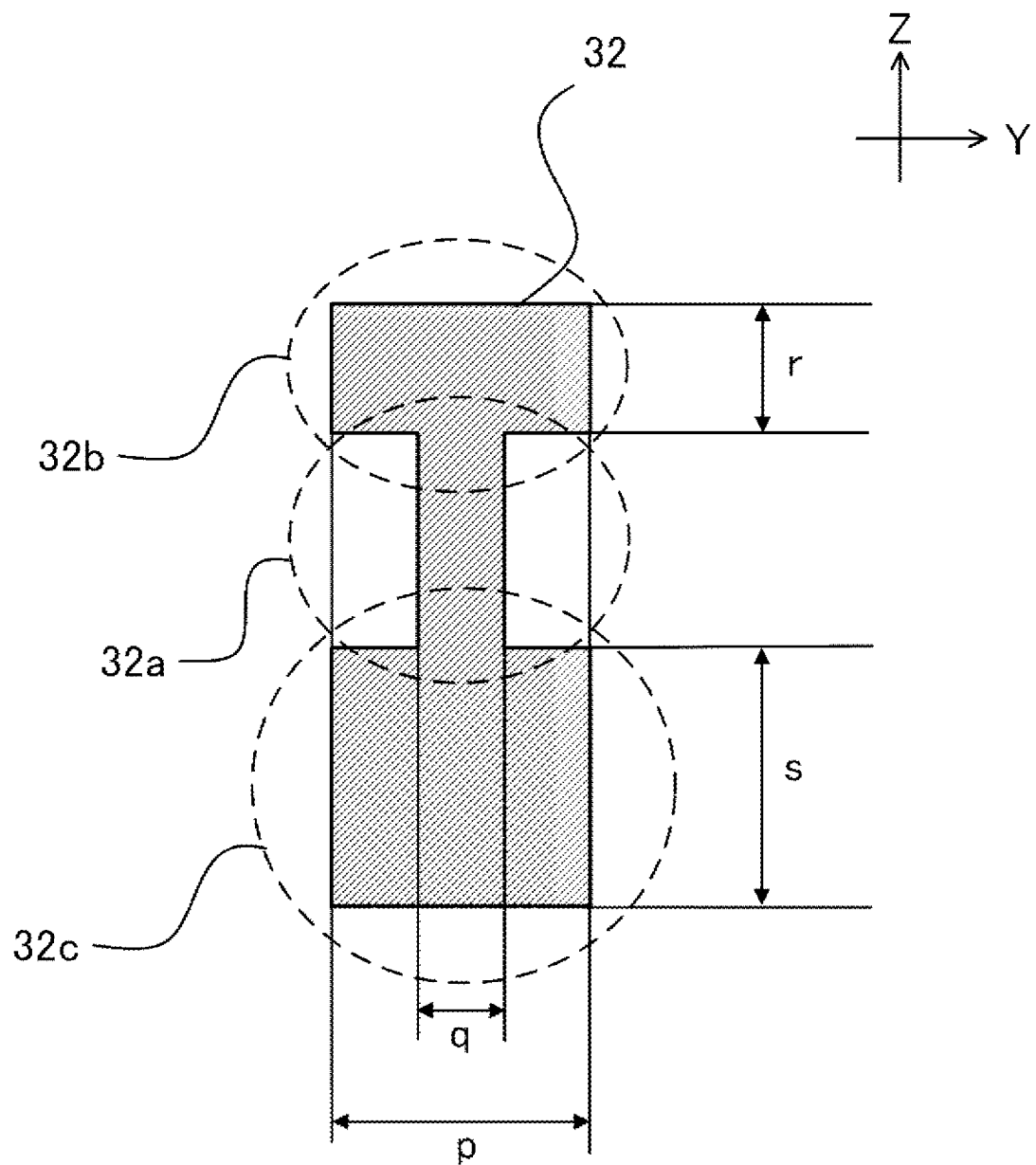
FIG. 8 is a cross-section of a connection portion of the axle beam taken along line D-D in FIG. 4, and illustrates only an end surface.

FIG. 8 is a cross-section of the connection portion 32 of the axle beam 31 taken along line D-D in FIG. 4, and illustrates only an end surface. The connection portion 32, whose basic thickness is a predetermined thickness p, partially has a thin portion 32a having a thickness q. The thin portion 32a is a portion where both surfaces of the connection portion 32 are recessed. A portion above the thin portion 32a in the vehicle height direction Z is an upper connection portion 32b, and a portion below the thin portion 32a in the vehicle height direction Z is a lower connection portion 32c. Suppose that the width of the upper connection portion 32b in the vehicle height direction Z is "r" and that the width of the lower connection portion 32c in the vehicle height direction Z is "s." Then s is smaller than r.

Due to this configuration, the thin portion 32a can reduce weight of the axle beam 31 as a whole. The upper connection portion 32b having the smaller width r than the width s of the lower connection portion 32c, that is, the lower connection portion 32c having the larger width s than the width r of the upper connection portion 32b, can ensure the strength against the bending stress input to the axle beam 31 and can thus further improve reliability.

As explained above, according to the suspension device for electric vehicle of the embodiment of the present invention, the saddle-side joint portion (hollow member joint portion) 42L, 42R has a projecting portion, and the axle-side joint portion (beam member joint portion) 35L, 35R includes a recessed portion to be engaged with the projecting portion. This configuration can increase the strength of the joint portion between the saddle (hollow member) 41L, 41R and the axle beam (beam member) 31. It is therefore possible to improve the reliability of the suspension device. It is also possible to increase the positional accuracy in joining the saddle 41L, 41R and the axle beam 31. The alignment of the axle beam and the saddle in a manufacturing process is thus facilitated, which can improve manufacturing efficiency.

The projecting portion of the axle-side joint portion 35L, 35R is formed so that a long side of the projecting portion extends in the vehicle width direction X, and the recessed portion of the saddle-side joint portion 42L, 42R is formed so that a long side of the recessed portion extends in the vehicle width direction X. Accordingly, the projecting portion and the recessed portion are used as guides in joining the axle beam 31 and the saddle 41L, 41R together so that the projecting portion and the recessed portion are slid while engaged with each other, which can facilitate the alignment. It is also possible to increase the strength against the shearing stress in the vertical direction (the gravity direction, the vehicle height direction Z) of the joint portion and the bending stress.

Embodiments of the suspension device 1 according to the present invention are not limited to the embodiment described above.

Figure 9:
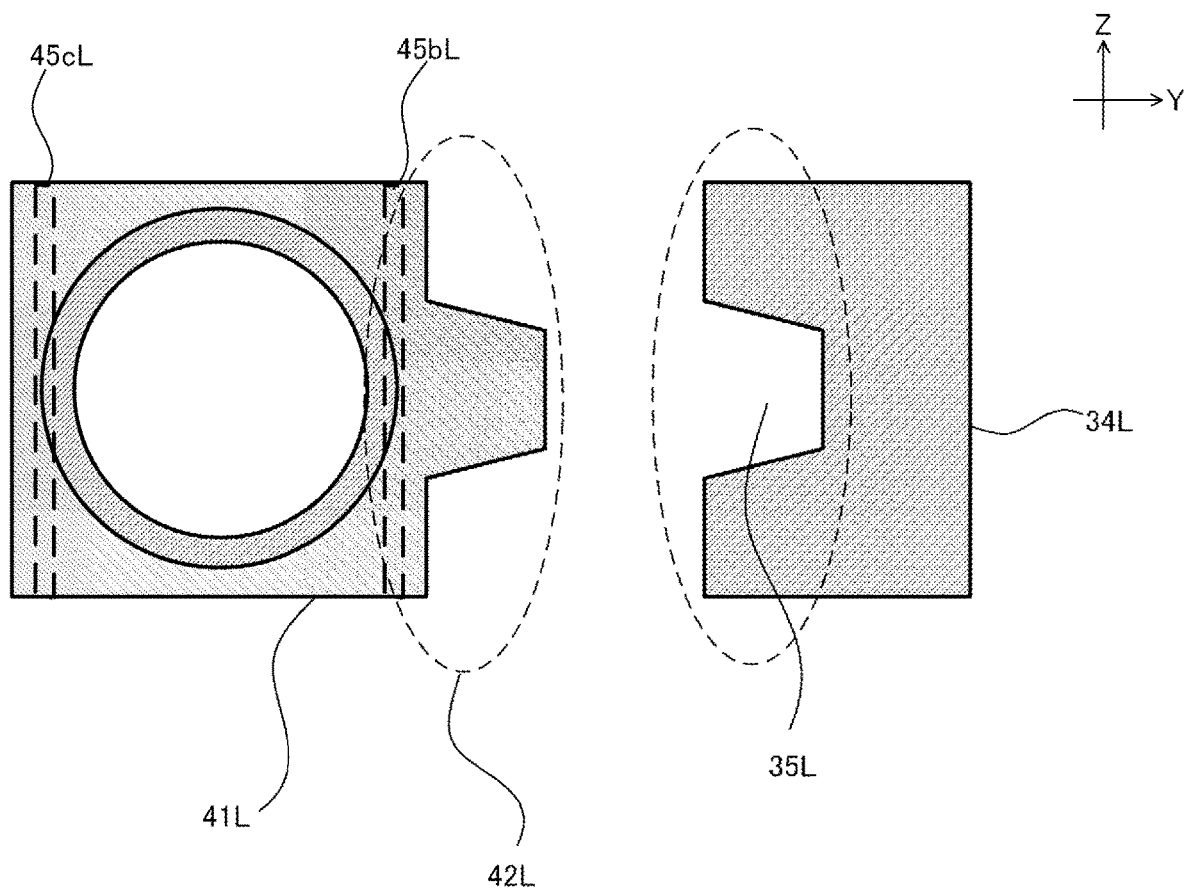
FIG. 9 is a cross-section of a variation of the end portion of the axle beam and the saddle taken along line C-C in FIG. 4, and illustrates only an end portion.

In the above embodiment, the projecting portion and the recessed portion have been described to have a rectangular cross-section. However, the shape is not limited thereto. FIG. 9 is a cross-section of a variation of the axle end portion 34L and the saddle 41L taken along line C-C in FIG. 4, and illustrates only an end portion. The recessed portion formed in axle-side joint portion 35L of the axle end portion 34L has a trapezoidal cross-sectional shape as viewed from the vehicle lateral side. The protrusion, which is formed in the saddle-side joint portion 42L of the saddle 41L and engages with the recessed portion, also has a trapezoidal cross-sectional shape. These configurations can increase the contact area between the projecting portion and the recessed portion and can improve the reliability of joint strength.

The recessed portion may be formed in the saddle-side joint portion 42L, 42R, and the projecting portion may be formed in the axle-side joint portion 35L, 35R.

The number and arrangement of the bolts for fastening the axle beam 31 and the saddle 41L, 41R to each other may optionally be modified.

The projecting portion may be formed as a projection with a long side extending in the vehicle height direction Z. The recessed portion may be formed as a slit with a long side extending in the vehicle height direction Z.

Figure 10:
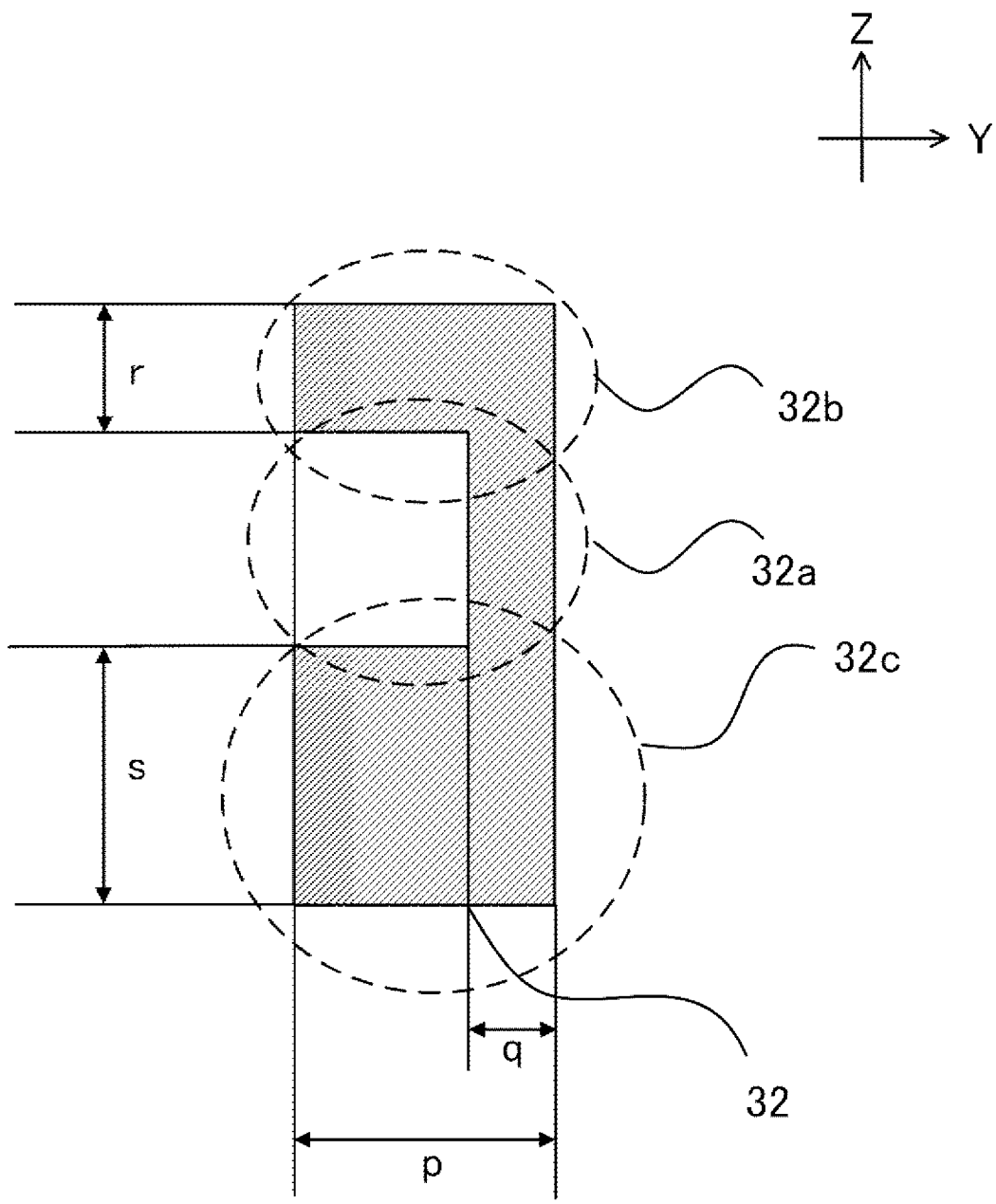
FIG. 10 is a cross-section of a variation of the connection portion of the axle beam taken along line D-D in FIG. 4, and illustrates only an end surface.

FIG. 10 is a cross-section of a variation of the connection portion 32 of the axle beam 31 taken along line D-D in FIG. 4, and illustrates only an end surface. As illustrated in FIG. 10, the thin portion 32a of the connection portion 32 may be a portion where a surface of the connection portion 32 facing frontward in the vehicle longitudinal direction Y is recessed.

Figure 11:
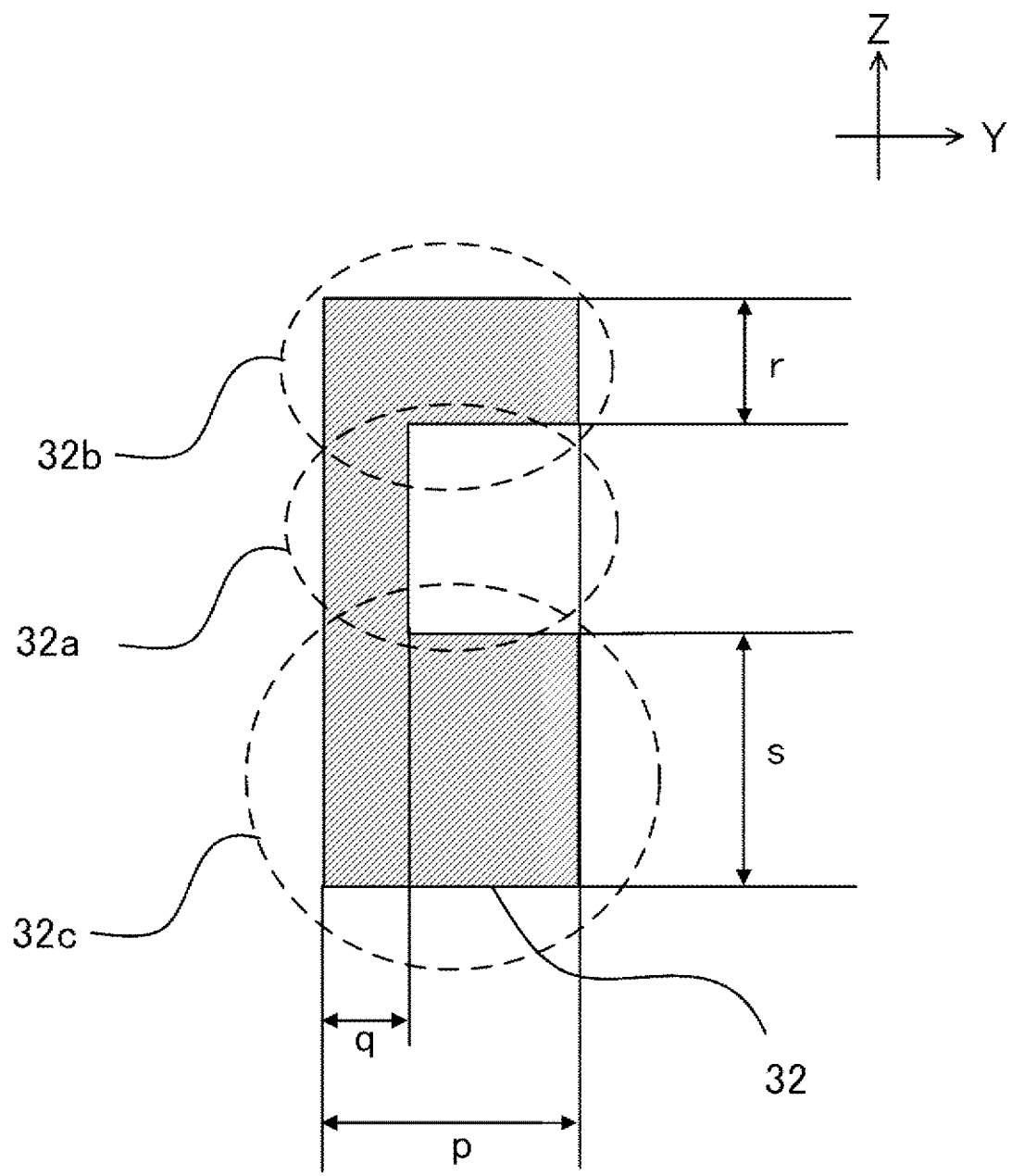
FIG. 11 is a cross-section of another variation of the connection portion of the axle beam taken along line D-D in FIG. 4, and illustrates only an end surface.

FIG. 11 is a cross-section of another variation of the connection portion 32 of the axle beam 31 taken along line D-D in FIG. 4, and illustrates only an end surface. As illustrated in FIG. 11, the thin portion 32a of the connection portion 32 may be a portion where a surface of the connection portion 32 facing rearward in the vehicle longitudinal direction Y is recessed.

The cross-sectional shape of the axle beam 31 is not limited to the cross-sectional shapes illustrated in the drawings, and may be a columnar cross-sectional shape including a cylindrical cross-sectional shape, as long as the rigidity of the axle structure 30 can be ensured.

Needless to say, the suspension device 1 of the present embodiment provides the above-mentioned advantages not only when applied to an electric commercial vehicle, such as an electric truck, but also when applied to an electric vehicle including a passenger car having a greater vehicle weight.

DESCRIPTION OF REFERENCE CHARACTERS

1 Suspension Device
2 Motor
4 Power Transmission Mechanism (Differential Gear)
6L, 6R Drive Shaft
8L, 8R Wheel
10L, 10R Side Rail
12L, 12R Spindle
14L, 14R Shock Absorber
16L, 16R Leaf Spring (Elastic Body)
20L, 20R Hub
22L, 22R Flexible Joint
24L, 24R Boot
30 Axle Structure
31 Axle Beam (Beam Member)
32 Connection Portion
33L, 33R Extension Portion
34L, 34R Axle End Portion
35L, 35R Axle-Side Joint Portion
38L, 38R Thick Portion
41L, 41R Saddle (Hollow Member)
42L, 42R Saddle-Side Joint Portion

The invention claimed is:

1. A suspension device for electric vehicle, the suspension device comprising:
a power transmission mechanism to which a driving force of a motor mounted on a vehicle is transmitted and a pair of drive shafts configured to transmit the driving force transmitted to the power transmission mechanism to a pair of wheels,
the suspension device for electric vehicle including:
a pair of hollow members each connected to an elastic body configured to suspend a vehicle body of the vehicle, the pair of hollow members each configured to house, in an internal space of the hollow member, part of an associated one of the pair of drive shafts, and
a beam member joined to the pair of hollow members by bolt fastening,
at least one of a hollow member joint portion or a beam member joint portion having a projecting portion, the hollow member joint portion constituting a side surface of each of the hollow members, the beam member joint portion constituting a side surface of an end portion of the beam member, the other one of the hollow member joint portion or the beam member joint portion having a recessed portion.

2. The suspension device for electric vehicle of claim 1, wherein
the projecting portion and the recessed portion each have a rectangular cross-sectional shape as viewed from a vehicle lateral side.

3. The suspension device for electric vehicle of claim 1, wherein
the projecting portion and the recessed portion each have a trapezoidal cross-sectional shape as viewed from a vehicle lateral side.

4. The suspension device for electric vehicle of claim 1, wherein
the projecting portion is formed so that a long side of the projecting portion extends in a vehicle width direction of the vehicle, and
the recessed portion is formed so that a long side of the recessed portion extends in the vehicle width direction of the vehicle.

5. The suspension device for electric vehicle of claim 1, wherein
the projecting portion is provided at the side surface of each of the hollow members.

6. The suspension device for electric vehicle of claim 1, wherein
a plurality of bolts for joining the beam member and each of the hollow members include a first bolt fastening portion group of a plurality of bolt fastening portions, a second bolt fastening portion group of a plurality of bolt fastening portions, and a third bolt fastening portion group of a plurality of bolt fastening portions, the first bolt fastening portion group being arranged in a first vehicle height position at a predetermined interval along the vehicle width direction, the second bolt fastening portion group being arranged in a second vehicle height position higher than the first vehicle height position at a predetermined interval along the vehicle width direction, the third bolt fastening portion group being arranged in a third vehicle height position between the first vehicle height position and the second vehicle height position at a predetermined interval along the vehicle width direction, and
the third bolt fastening portion group is disposed so as to pass through the projecting portion and the recessed portion.

7. The suspension device for electric vehicle of claim 6, wherein
the first bolt fastening portion group and the second bolt fastening portion group are located at same positions in the vehicle width direction,
the third bolt fastening portion group is located at a position between the first bolt fastening portion group and the second bolt fastening portion group in the vehicle width direction, and among the plurality of bolt fastening portions, the bolt fastening portion closest to the wheel of the vehicle belongs to the third bolt fastening portion group.

8. The suspension device for electric vehicle of claim 6, wherein among the bolts for joining the beam member and each of the hollow members, the bolts belonging to the second bolt fastening portion group have a diameter larger than a diameter of the bolts belonging to the first bolt fastening portion group and the second bolt fastening portion group.

9. The suspension device for electric vehicle of claim 1, wherein the beam member is an integrally forged plate-like member having a predetermined width to support the pair of wheels and includes: a pair of axle end portions to be joined to the respective hollow members; a pair of extension portions extending from the respective axle end portions inwardly toward a rear side of the vehicle; and a connection portion that connects the pair of extension portions.

10. The suspension device for electric vehicle of claim 9, wherein a boundary area between each of the extension portions and the connection portion is provided with a thick portion in a lower portion of the boundary area in a vehicle height direction, the thick portion having a width larger than the predetermined width, and the thick portion has a support portion for supporting a component relating to the suspension device.

11. The suspension device for electric vehicle of claim 9, wherein the connection portion includes a thin portion extending in the vehicle width direction and having a width smaller than the predetermined width, an upper connection portion above the thin portion in the vehicle height direction, and a lower connection portion below the thin portion in the vehicle height direction, and a width of the upper connection portion in the vehicle height direction is smaller than a width of the lower connection portion in the vehicle height direction.

* * * * *